US008110615B2

(12) United States Patent
Zhu et al.

(10) Patent No.: US 8,110,615 B2
(45) Date of Patent: Feb. 7, 2012

(54) CORRECTION FLUIDS

(75) Inventors: Jiandong Zhu, Aurora, IL (US); John Thompson, Medfield, MA (US); Richard J. Kaiser, Allentown, PA (US); George Korper, Hendersonville, NC (US)

(73) Assignee: Sanford, L.P., Oak Brook, IL (US)

( * ) Notice: Subject to any disclaimer, the term of this patent is extended or adjusted under 35 U.S.C. 154(b) by 485 days.

(21) Appl. No.: 11/499,111

(22) Filed: Aug. 4, 2006

(65) Prior Publication Data

US 2007/0142502 A1 Jun. 21, 2007

Related U.S. Application Data

(60) Provisional application No. 60/706,000, filed on Aug. 4, 2005.

(51) Int. Cl.
*C09D 11/00* (2006.01)
(52) U.S. Cl. ............... 523/160; 523/161; 106/31.17; 106/31.19
(58) Field of Classification Search ................. 523/161; 524/145, 557; 401/260
See application file for complete search history.

(56) References Cited

U.S. PATENT DOCUMENTS

| | | | |
|---|---|---|---|
| 2,029,152 A | 1/1936 | Bonkowski | |
| 3,941,488 A | 3/1976 | Maxwell | |
| 3,985,455 A | 10/1976 | Wahlberg | |
| 4,032,491 A | 6/1977 | Schoenke | |
| 4,071,645 A | 1/1978 | Kahn | |
| 4,128,508 A * | 12/1978 | Munden | 512/1 |
| 4,148,591 A | 4/1979 | Tomura | |
| 4,156,657 A | 5/1979 | Lin | |
| 4,170,669 A | 10/1979 | Okada | |
| 4,172,064 A | 10/1979 | Keeler | |
| 4,213,717 A | 7/1980 | Lin | |
| 4,227,930 A | 10/1980 | Lin | |
| 4,228,028 A | 10/1980 | Lin | |
| 4,243,417 A | 1/1981 | Grourke et al. | |
| 4,252,845 A | 2/1981 | Griffiths et al. | |
| 4,283,320 A | 8/1981 | Carroll et al. | |
| 4,349,639 A | 9/1982 | Muller | |
| 4,365,035 A | 12/1982 | Zabiak | |
| 4,509,875 A | 4/1985 | Shintani | |
| 4,557,618 A | 12/1985 | Iwata et al. | |
| 4,580,918 A | 4/1986 | Baker et al. | |
| 4,654,081 A * | 3/1987 | Dalzell | 524/145 |
| 4,824,827 A | 4/1989 | Kelly et al. | |
| 4,865,479 A | 9/1989 | Doll | |
| 4,954,544 A | 9/1990 | Chandaria | |
| 5,026,189 A | 6/1991 | Keil | |
| 5,033,895 A | 7/1991 | Aida | |
| 5,139,572 A | 8/1992 | Kawashima | |
| 5,196,243 A | 3/1993 | Kawashima | |
| 5,215,956 A | 6/1993 | Kawashima | |
| 5,232,494 A | 8/1993 | Miller | |
| 5,236,987 A | 8/1993 | Arendt | |
| 5,256,191 A | 10/1993 | Thompson et al. | |
| 5,326,388 A | 7/1994 | Miller et al. | |
| 5,338,123 A | 8/1994 | Obersteller et al. | |
| 5,370,471 A | 12/1994 | Kageyama et al. | |
| 5,418,013 A | 5/1995 | Detrick et al. | |
| 5,464,470 A | 11/1995 | Brachman et al. | |
| 5,478,382 A | 12/1995 | Miller et al. | |
| 5,486,228 A | 1/1996 | Miller et al. | |
| 5,489,331 A | 2/1996 | Miller et al. | |
| 5,492,558 A | 2/1996 | Miller et al. | |
| 5,498,282 A | 3/1996 | Miller et al. | |
| 5,498,285 A | 3/1996 | Hooykaas | |
| 5,499,881 A | 3/1996 | Chang | |
| 5,509,742 A | 4/1996 | Balzarini | |
| 5,649,999 A | 7/1997 | Wang | |
| 5,762,077 A | 6/1998 | Griffiths, Jr. | |
| 5,872,162 A | 2/1999 | McHugh et al. | |
| 5,877,234 A | 3/1999 | Xu et al. | |
| 5,916,357 A | 6/1999 | Wang et al. | |
| 5,964,931 A | 10/1999 | Korper | |
| 5,964,932 A | 10/1999 | Ison et al. | |
| 5,997,891 A | 12/1999 | Fuerst et al. | |
| 6,149,721 A | 11/2000 | Wang et al. | |
| 6,179,501 B1 | 1/2001 | Fulop | |
| 6,221,432 B1 | 4/2001 | Wang et al. | |
| 6,276,853 B1 | 8/2001 | Breidenbach et al. | |
| 6,341,856 B1 * | 1/2002 | Thompson et al. | 347/100 |
| 6,357,943 B1 | 3/2002 | Kuang | |
| 6,412,998 B1 | 7/2002 | Ham | |
| 6,489,892 B2 | 12/2002 | Lawandy | |
| 6,491,464 B1 | 12/2002 | Young | |
| 6,554,516 B1 | 4/2003 | Christopher | |

(Continued)

FOREIGN PATENT DOCUMENTS

CN 1161911 10/1997

(Continued)

OTHER PUBLICATIONS

Maruya, Derwent Abstract 1987-017868 of JP Patent JP 61275369.*

(Continued)

*Primary Examiner* — Doris Lee
(74) *Attorney, Agent, or Firm* — Marshall, Gerstein & Borun LLP

(57) ABSTRACT

The application discloses stable correction fluids and/or correction fluids that change from colored to substantially white (or to a color substantially matching the color of a substrate to which the correction fluid is to be applied) after application to a substrate.

18 Claims, No Drawings

U.S. PATENT DOCUMENTS

| | | | |
|---|---|---|---|
| 6,894,095 | B2 | 5/2005 | Russo et al. |
| 7,442,725 | B2 | 10/2008 | Kwan et al. |
| 2002/0103283 | A1 | 8/2002 | Elfring et al. |
| 2002/0151648 | A1 | 10/2002 | Fasano et al. |
| 2003/0129015 | A1 * | 7/2003 | Sexton ............................ 401/199 |
| 2004/0014875 | A1 * | 1/2004 | Russo et al. .................. 524/557 |
| 2005/0075419 | A1 | 4/2005 | Kwan et al. |
| 2005/0143505 | A1 * | 6/2005 | Rosekelly et al. ............ 524/236 |

FOREIGN PATENT DOCUMENTS

| | | | |
|---|---|---|---|
| EP | 0488980 A1 * | 3/1992 | |
| EP | 0488980 A1 | 6/1992 | |
| EP | 0 549 145 | 6/1993 | |
| FR | 2749220 | 12/1997 | |
| GB | 2 058 110 A | 4/1981 | |
| JP | 59-124966 | 7/1984 | |
| JP | 59124966 | 7/1984 | |
| JP | 6-49397 | 2/1994 | |
| JP | 6049397 | 2/1994 | |
| JP | 8134387 | 5/1996 | |
| JP | 2000-313829 A | 11/2000 | |
| JP | 2001/158196 | 6/2001 | |
| WO | WO-92/07914 A1 | 5/1992 | |
| WO | WO-96/23843 A1 | 8/1996 | |
| WO | WO-2005/040290 A1 | 5/2005 | |

OTHER PUBLICATIONS

Partial International Search for International Application No. PCT/US2006/030487, dated Dec. 21, 2006.

International Search Report for PCT/US2006/030487 dated Feb. 14, 2007.

Written Opinion of the International Searching Authority for PCT/US2006/030487 dated Feb. 14, 2007.

European Search Report for Application No. 09014597, dated Feb. 9, 2010.

* cited by examiner

CORRECTION FLUIDS

CROSS-REFERENCE TO RELATED APPLICATION

The benefit under 35 U.S.C. §119(e) of U.S. provisional patent application Ser. No. 60/706,000 filed Aug. 4, 2005, the entire disclosure of which is incorporated herein by reference, is hereby claimed.

BACKGROUND OF THE DISCLOSURE

1. Field of the Disclosure

The disclosure is generally related to correction fluids. More particularly, the disclosure is related to stable correction fluids and to solvent-based correction fluids that change from colored to substantially white (or to a color substantially matching the substrate color) after application to a substrate.

2. Brief Description of Related Technology

Correction fluids are typically used to correct handwritten, typewritten, photocopied, and/or printed markings on paper, cardboard, glass, and other substrates. Correction fluids are usually applied to the substrates as liquids. The applied liquids subsequently dry to form an opaque film, which should be capable of (1) effectively covering and concealing any undesirable markings previously made on the substrate, and (2) being written upon such that it can 'receive' new corrected markings. The film should remain bonded to the substrate surface over time, and be sufficiently flexible such that the film will not crack or otherwise be displaced from the substrate during normal handling. Additionally, the film (and ideally, the liquid form of the correction fluid) should not interact with the ink composition of the corrected markings because such an interaction would likely cause discoloration of the film. Furthermore, the drying time of the correction fluid should be as fast as possible in order to allow corrected markings to be made over the film relatively soon after application of the correction fluid.

Correction fluids typically include an opacifying pigment (e.g., titanium dioxide), a film-forming polymer, and a solvent. The opacifying pigment is dispersed in the correction fluid, and allows the film to conceal any undesirable markings previously made on the substrate. The film-forming polymer is dissolved in the correction fluid, and allows the correction fluid to form a flexible, continuous film (or covering) that remains on the substrate once the solvent has evaporated. The solvent is the carrier for the opacifying pigment and the film-forming polymer, and can be either a volatile organic solvent or water. Volatile organic solvents have the advantage of evaporating quickly, and as a result, organic solvent-based correction fluids are often ready to receive corrected markings more quickly than water-based correction fluids. Water-based correction fluids are generally preferred for environmental reasons, however.

One problem associated with current correction fluids is that it is difficult for the consumer to determine when the correction fluid has dried sufficiently. Consequently, the consumer is forced to employ a trial and error technique to determine if the fluid has sufficiently dried. If the consumer attempts to make written marks over an insufficiently dried film, the writing point of the consumer's writing instrument will likely disrupt film formation by penetrating the partially-dried film. Disrupting film formation in this manner often causes some undesirable markings, which were intended to be concealed and covered by the applied correction fluid, to become visible and at least partially uncovered. Thus, when a consumer writes over an insufficiently dried film, the consumer must often apply an additional coat of correction fluid over the uncovered undesirable markings, wait for the applied correction fluid to dry sufficiently to form a film that can receive a written mark, and again make corrected written marks over the film. Additionally, disrupting film formation often causes the final film to have an especially uneven or unsmooth surface, which can be unsightly, particularly after receiving written markings thereover.

One solution to the problem of determining when a correction fluid has sufficiently dried so as to allow marking to be made thereover is described in Japanese Patent No. JP 6049397, which discloses a correction fluid including an opacifying pigment, water, a volatile organic solvent such as ethanol or acetone, and a reagent that changes from a first color to a second color, which allegedly occurs substantially simultaneously with the completion of solvent evaporation. The color-change of the disclosed formulations is caused by reaction with air. In one formulation, the color-change is caused by absorption of ambient carbon dioxide. In another formulation, the color-change is caused by air oxidation. In both formulations, the color-change reactions are slow and unreliable, and are not directly related to solvent evaporation (and thus sufficient drying of the correction fluid).

Commonly owned and copending U.S. patent application Ser. No. 10/776,860, which published as U.S. Patent Publication No. 2005/0075419 on Apr. 7, 2005, and which is incorporated herein by reference in its entirety, discloses a water-based color changing correction fluid. However, although water-based correction fluids are often more environmentally friendly than organic solvent-based correction fluids, the drying time and the covering ability of water-based correction fluids (the latter deficiency being of particular concern for water soluble dye containing water-based inks as bleeding of the ink into the applied correction fluid often occurs) are often not satisfactory. Furthermore, it has been difficult to utilize the color changing chemistries applied in water-based correction fluids to solvent-based correction fluids.

The opacifying pigments contained in correction fluids can settle over time, and therefore correction fluids must often be mixed before being applied to a substrate. Many application systems, for example, bottle and brush correction fluid systems and bottle and foam applicator correction fluid systems, allow the consumer to mix the contained correction fluid, as necessary. Conventional capillary-action markers contain a fibrous reservoir and a nib in fluid communication therewith, and therefore do not allow correction fluids contained therein to be effectively mixed. Further, the marker's reservoir fibers can undesirably filter any opacifying pigments contained therein and become clogged over time. Accordingly, over time, the marker is generally rendered incapable of making corrective markings. Thus, it has also been particularly difficult to achieve capillary-action markers containing a correction fluid that is stable therein because such applicator systems do not accommodate mixing and can become clogged.

DETAILED DESCRIPTION

The disclosure provides color-change correction fluids that provide a positive indication when they have dried sufficiently, for example, to allow written or printed corrected marks to be made thereover. The disclosure also provides correction fluids which are not susceptible to pigment settling (at least relative to conventional correction fluids) and therefore may be used in a capillary-action markers, if desired. Such 'stable' correction fluids may or may not be color-change correction fluids, as described in further detail below.

The disclosed correction fluids may be used in correction fluid applicators including but not limited to bottle and brush correction fluid systems, bottle and foam applicator correction fluid systems, correction pens including a pin valve, correction pens including a roller valve, and correction markers. Preferred correction fluid applicators are sold under the LIQUID PAPER® trade name (Sanford, L.P., Oakbrook, Ill.).

The color-change correction fluids of the disclosure are initially colored, but become substantially white relatively shortly after application to a substrate (e.g., paper). Alternatively, the color-change correction fluids change from a first color to a second color which substantially matches the substrate color relatively shortly after application to the substrate. The color-change from colored to substantially white (or to a color substantially matching the substrate color) provides the consumer with a visual cue that the applied film of correction fluid has dried sufficiently (after application) so as to allow written or printed corrected marks to be made thereover. Advantageously, the color-change of the color-change correction fluid directly corresponds to the correction fluid drying time because evaporation of the color-change correction fluid solvent system (more specifically, evaporation of a volatile acid or a volatile base, as will be explained in more detail below) causes the color-change to occur. Thus, the color-change of the color-change correction fluid occurs at substantially the same time that an applied film of the correction fluid becomes sufficiently dry so as to receive a corrective marking. Preferably, the applied color-change correction fluid becomes substantially white (or a color substantially matching the substrate color) and sufficiently dry so as to receive a corrective marking at approximately the same time. Alternatively, the color-change from colored to substantially white (or to a color substantially matching the substrate color) may occur shortly after the applied correction fluid becomes sufficiently dry so as to receive a corrected written marking (e.g., within about 10 seconds, more preferably within about five seconds after the color-change correction fluid dry time).

In one embodiment, the disclosure provides color-change correction fluids generally comprising an opacifying pigment (e.g., titanium dioxide), a film-forming polymer, a solvent system comprising an aliphatic solvent and one of a volatile acid and a volatile base, and a color-change dye that becomes substantially colorless upon evaporation of the solvent system. The correction fluids can also include an additional pigment(s) so that the correction fluid substantially matches or otherwise closely corresponds to the color of the substrate to which the correction fluid is to be applied.

Suitable color-change dyes change color pursuant to a local change in either acid concentration or base concentration, and are typically colored in the presence of either an acid or a base. The local change in either acid concentration or base concentration is generally caused by the evaporation of the correction fluid solvent system (which includes either a volatile acid or a volatile base). The color-change from colored to substantially colorless can result from electron transfer and/or proton transfer reactions.

In one aspect, the color-change correction fluid comprises an opacifying pigment, a film-forming polymer, a solvent system comprising an aliphatic solvent and a volatile base, and a color-change dye that becomes substantially colorless upon evaporation of the solvent system. The color-change dye can be a pH indicator dye. The color-change dye is colored under basic conditions, and thus the correction fluid composition is initially colored.

In another aspect, the color-change correction fluid comprises an opacifying pigment, a film-forming polymer, a solvent system comprising an aliphatic solvent and a volatile acid, and a color-change dye that becomes substantially colorless upon evaporation of the solvent system. The color-change dye can be a leuco dye. The color-change dye is colored under acidic conditions, and thus the correction fluid composition is initially colored.

In a further aspect, the disclosure provides color-change correction fluids generally comprising an opacifying pigment (e.g., titanium dioxide), a film-forming polymer, a solvent system comprising an aliphatic solvent and one of a volatile acid and a volatile base, and a color-change dye that becomes substantially colorless upon evaporation of the solvent system, wherein the color-change dye is emulsified into the correction fluid to provide a water-in-oil emulsion. Emulsifying the color-change dye into the color-change correction fluid has been found to improve the compatibility of the color-change dyes in the color-change correction fluids, and to provide a color-change correction fluid that is more stable over time.

In yet another aspect, the disclosure provides color-change correction fluids generally comprising an opacifying pigment (e.g., titanium dioxide) dispersion, a film-forming polymer, a solvent system comprising an aliphatic solvent and one of a volatile acid and a volatile base, and a color-change dye that becomes substantially colorless upon evaporation of the solvent system, wherein the opacifying pigment dispersion is emulsified into the correction fluid to provide a water-in-oil emulsion. The correction fluids containing an emulsified opacifying pigment can also include an additional pigment(s) to substantially match or otherwise closely corresponds to the color of the substrate to which the correction fluid is to be applied, as previously described. The additional pigment(s) may also be emulsified into the correction fluid to provide a water-in-oil emulsion. Further, both the opacifying pigment and the color-change dye may be emulsified into the color-change correction fluids.

Emulsification of the opacifying pigment has been found to provide a surprisingly stable correction fluid, which is particularly useful in capillary-action markers. (Such correction fluids can also be used in other various correction fluid applicator systems, as previously described.) Thus, another embodiment of the disclosure provides correction fluids generally comprising an opacifying pigment (e.g., titanium dioxide) dispersion, a film-forming polymer, and a solvent system comprising an aliphatic solvent, wherein the opacifying pigment dispersion is emulsified into the correction fluid to provide a water-in-oil emulsion. One aspect of this embodiment is a capillary-action marker comprising a fibrous reservoir containing a correction fluid comprising an opacifying pigment (e.g., titanium dioxide) dispersion, a film-forming polymer, and a solvent system comprising an aliphatic solvent, wherein the opacifying pigment dispersion is emulsified into the correction fluid to provide a water-in-oil emulsion, and a porous nib in fluid communication with the fibrous reservoir. The correction fluid need not be capable of changing color, as described herein.

The opacifying pigment can be emulsified into correction fluids by adding an aqueous dispersion of the opacifying pigment to a solution comprising a film-forming polymer, an aliphatic solvent, and a surfactant present in an amount sufficient to form a correction fluid comprising a stable water-in-oil emulsion of the opacifying pigment particles. Alternatively, the opacifying pigment can be emulsified into the correction fluid by adding an aqueous dispersion of opacifying pigment and a surfactant to a solution comprising a film-forming polymer and the aliphatic solvent, wherein the surfactant is present in an amount sufficient to form a correction fluid comprising a stable water-in-oil emulsion of the opacifying pigment particles. The surfactant may therefore be in either phase (i.e., the oil phase or the water phase).

When an emulsification technique is applied to provide a color-change correction fluid in accordance with the disclosure, the opacifying pigment and the color-change dye can be emulsified into the correction fluid by adding an aqueous phase containing a dispersion of the opacifying pigment, one of a volatile base and a volatile acid, and a color-change dye to a solution comprising a film-forming polymer and an aliphatic solvent. The phase where the surfactant is contained is generally immaterial provided that it is present in an amount sufficient to form a color-change correction fluid comprising a stable water-in-oil emulsion of the opacifying pigment particles and the color-change dye. Similarly, the opacifying pigment and/or the color-change dye can be emulsified into the correction fluid by adding an aqueous phase containing a dispersion of the opacifying pigment, one of a volatile base and a volatile acid, and a color-change dye to a solution comprising a film-forming polymer, an aliphatic solvent, and opacifying pigment particles. Again, the phase where the surfactant is contained is generally immaterial provided that it is present in an amount sufficient to form a color-change correction fluid comprising a stable water-in-oil emulsion of the opacifying pigment particles and the color-change dye.

Alternatively, the color-change dye alone can be emulsified into the correction fluid by adding an aqueous solution containing one of a volatile base and a volatile acid, and a color-change dye to a solution comprising a film-forming polymer, an aliphatic solvent, and a surfactant in an amount sufficient to form a mixture comprising a stable water-in-oil emulsion of the color-change dye. In this instance, however, opacifying pigment particles must be added in a subsequent step in order to provide a color-change correction fluid. Finally, the color-change dye can be emulsified into the correction fluid by adding an aqueous phase containing one of a volatile base and a volatile acid, and a color-change dye to an oil phase comprising a film-forming polymer, an aliphatic solvent, and opacifying pigment particles. The phase where the surfactant is contained is generally immaterial provided that it is present in an amount sufficient to form a color-change correction fluid comprising a stable water-in-oil emulsion of the color-change dye.

Any suitable surfactant, which is generally defined herein to include but not be limited to anionic surfactants, ionic surfactants, emulsifiers, co-surfactants, and mixtures thereof, which is capable of forming a water-in-oil emulsion may be used, but emulsifiers are generally preferred. The amount of surfactant generally depends on its solubility in the various phases. The surfactants should generally be alkali-stable if formulated in a color-change correction fluid containing a volatile base, or acid-stable if formulated in a color-change correction fluid containing a volatile acid. Suitable surfactants include but are not limited to ether-type non-ionic surfactants sold under the BRIJ™ and MONAMULSE™ tradenames (Uniqema, London, England) and anionic surfactants sold under the MACKANATE™ tradename (McIntyre Group, Ltd., University Park, Ill.). An exemplary anionic surfactant for emulsifying the opacifying pigment and/or the color-change dyes into the correction fluids comprises dioctyl sodium sulfosuccinate, e.g., MACKANATE™ DOS-70MS. The correction fluids comprising water-in-oil emulsions generally comprise about 0.01 wt. % to about 25 wt. %, 0.1 wt. % to about 20 wt. %, and/or about 0.5 wt. % to about 15 wt. % of surfactant. Alternatively, the color-change correction fluids comprising water-in-oil emulsions contain less than about 25 wt. %, less than about 15 wt. %, less than about 10 wt. %, and/or less than about 5 wt. % of surfactant. The resulting water-in-oil (W/O) emulsions can be macro-, nano-/mini-, or micro-emulsions. Nano/mini-emulsions and micro-emulsions are generally preferred due to their increased stabilities.

Suitable color-change dyes that are colored under basic conditions include but are not limited to o-cresolphthalein, phenolphthalein, thymolphthalein, m-nitrophenol, p-nitrophenol, cyanine, and bis-(2,4-dinitro-phenyl)acetic acid ethyl ester. Such color-change dyes can be synthetically modified by introduction of substituents such as aliphatic carbon chains, for example, t-butyl, n-heptyl, trimethylsilyl, or surfactant moieties, for example, amine alkylbenzene sulfonate, polyoxyethylene(1) lauryl sulfate, and olefin($C_{14}$-$C_{16}$) sulfonate, and used as the color-change dye. Synthetically modifying the color-change dyes to include such substituents will make the dyes more soluble or dispersible in the aliphatic solvents typically used for correction fluids. Alternatively, a pigment having a suitable color-change dye adsorbed thereto can be used. The color-change correction fluid typically comprises from about 0.001 wt. % to about 15 wt. %, about 0.01 wt. % to about 10 wt. %, about 0.1 wt. % to about 5 wt. %, and/or about 0.15 wt. % to about 2 wt. % of the color-change dye.

Suitable volatile bases include but are not limited to volatile amines such as ammonia, tri-ethylamine (TEA), 2-amino-2-methyl-1-propanol (AMP) and its derivatives, morpholine and its derivatives, and N,N-dimethylethanolamine (DMEA). Other volatile basic materials may also be used. Generally, the volatile base is contained in an amount sufficient to cause the color-change dye to exhibit its characteristic color (so the amount depends on the specific color-change dye employed). The color-change correction fluid typically comprises from about 0.001 wt. % to about 15 wt. %, about 0.01 wt. % to about 10 wt. %, 0.1 wt. % to about 5 wt. %, and/or about 0.15 wt. % to about 2 wt. % of the volatile base.

Suitable color-change dyes that are colored under acidic conditions include but are not limited to phthalide-type color-forming dyes such as diarylphthalide dyes and indolylphthalide dyes, fluoran dyes, acylleucoazine dyes, leucoauramine dyes, spiropyrane dyes, rhodaminelactam dyes, triarylmethane dyes, and chromene dyes. Such color-changes dyes can be synthetically modified by introduction of substituents such as aliphatic carbon chains, for example, t-butyl, n-heptyl, trimethylsilyl, or surfactant moieties, for example, amine alkylbenzene sulfonate, polyoxyethylene(1) lauryl sulfate, and olefin($C_{14}$-$C_{16}$) sulfonate, and used as the color-change dye. Synthetically modifying the color-change dyes to include such substituents will make the dyes more soluble or dispersible in the aliphatic solvents typically used for solvent-based correction fluids. Alternatively, a pigment having a suitable color-change dye adsorbed thereto can be used as the color-change dye. Suitable color-change dyes are commercially available under the PERGASCRIPT® trade name (Ciba-Geigy Corporation, Greensboro, N.C.) and under the COPIKEM® trade name (Hilton Davis Company, Cincinnati, Ohio). Preferred color-change dyes include crystal violet lactone, malachite green lactone, PERGASCRIPT® red I-6B (a bis-indolyl phthalide dye), PERGASCRIPT® black I-2R (a diamino fluoran dye), PERGASCRIPT® I-2G (a xanthene dye), COPIKEM® 1 Blue CVL, Vermilion-DCF (Hodogaya Chemical (USA) Inc.), Red-DCF (Hodogaya Chemical (USA) Inc.), and Orange-DCF (Hodogaya Chemical (USA) Inc.). The color-change correction fluid typically comprises from about 0.001 wt. % to about 15 wt. %, about 0.01 wt. % to about 10 wt. %, about 0.1 wt. % to about 5 wt. %, and/or about 0.15 wt. % to about 2 wt. % of the color-change dye.

Suitable volatile acids include but are not limited to formic acid, acetic acid, and trifluoroacetic acid. Other volatile acidic materials may also be used. Generally, the volatile acid is contained in an amount sufficient to cause the color-change dye to exhibit its characteristic color (so the amount depends on the specific color-change dye employed). The color-change correction fluid typically comprises from about 0.001 wt. % to about 15 wt. %, about 0.01 wt. % to about 10 wt. %, 0.1 wt. % to about 5 wt. %, and/or about 0.15 wt. % to about 2 wt. % of the volatile acid.

The various correction fluid components contained in the color-change correction fluids may sometimes contain impurities and/or other constituents that can protonate the color-change dyes included therein. This is particularly problematic for the color-change correction fluids comprising a volatile acid because the correction fluid remains colored even after the solvent has evaporated because the contained impurities and/or other constituents in the correction fluids are not volatile. To overcome this problem, a neutralizer can be added to the color-change correction fluids. Suitable neutralizers include but are not limited to non-volatile amines such as trihexyl amine, tridecyl amine, and polyoxyalkeneamines. JEFFAMINE® HK-511 and JEFFAMINE® D-230 (Huntsman LLC, Houston Tex.) are two preferred neutralizers.

In order to increase the solubility of the color-change dye in the color-change correction fluids not comprising a water-in-oil emulsion, and the color intensity of the color-change correction fluids (before drying), it may be desirable to add a polar co-solvent. The amount of co-solvent that can be used is limited, however, in order not to cause inks and toners in the area being corrected to bleed into the applied correction fluid. Typically, the color-change correction fluid typically contains less than about 15 wt. %, less than about 10 wt. %, less than about 5 wt. %, and/or less than about 3 wt. % of the polar co-solvent. Suitable polar co-solvents include but are not limited to polar solvents such as 1,3 dioxalane, tetrahydrofuran, n-butyl acetate, methyl isobutyl ketone, and mixtures thereof.

Suitable opacifying pigments include but are not limited to titanium dioxide pigments such as TI-PURE® R-931 (DuPont Company, Wilmington, Del.) and KRONOS® 2131 or 2102 (Kronos Inc, Houston, Tex.). Other opacifying pigments such as zinc oxide may also be used, either alone or in combination with the titanium dioxide. The color-change correction fluid typically comprises from about 15 wt. % to about 65 wt. %, about 25 wt. % to about 65 wt. %, about 25 wt. % to about 55 wt. %, and/or about 25 wt. % to about 45 wt. % of the opacifying pigment.

Extender pigments such as NEOGEN® 2000 (Imerys, Roswell, Ga.) can also be included to minimize pigment costs and enhance correction fluid properties (e.g., adding an extender pigment can reduce pigment settling and/or increase the concealing power of the correction fluid). The color-change correction fluid typically comprises from 0 wt. % to about 50 wt. %, 0 wt. % to about 40 wt. %, 0 wt. % to about 30 wt. %, and/or 0 wt. % to about 15 wt. % of the extender pigment. For example, calcium carbonate and/or other basic extender pigments can be used (with or without the same amount of titanium dioxide pigment) to reduce the amount of volatile base used; on the other hand, clay and/or other acidic extender pigments can be used (with or without the same amount of titanium dioxide pigment) to reduce the amount of volatile acid used. Similarly, the correction fluids could include an amount of a non-volatile acid or a non-volatile base to reduce the amount of volatile acid or volatile based used in the color-change correction fluids. Reducing the amount of the volatile acid/base component can be helpful to optimize the matching of the color-change to the correction fluid dry time so that the color-change occurs at substantially the same time or shortly after the applied correction fluid film becomes sufficiently dry so as to receive a corrective marking.

Suitable film forming resins for use in the correction fluids according to the disclosure include but are not limited to acrylic resins, modified acrylic resins, phenolic resins, and modified phenolic resins. Exemplary resins include vinyl acrylic polymers such as PLIOWAY® Ultra 200 and PLIOWAY® Ultra 350 (Eliokem, Akron, Ohio) and acrylic resins such as NT-2 acrylic resin (Nissei Trading Co., Ltd., Tokyo, JP). The correction fluids typically comprise from about 1 wt. % to about 40 wt. %, about 2 wt. % to about 30 wt. %, 3 wt. % to about 20 wt. %, and/or about 5 wt. % to about 20 wt. % of the resin.

The solvent system typically comprises either a volatile acid or a volatile base (as described above) and an aliphatic solvent including but not limited to aliphatic solvents such as n-heptane, cyclohexane, methyl cyclohexane, and mixtures thereof. The color-change correction fluid typically comprises from about 5 wt. % to about 65 wt. %, about 10 wt. % to about 55 wt. %, 15 wt. % to about 50 wt. %, and/or about 20 wt. % to about 40 wt. % of the solvent system.

Various additives including but not limited to pigment dispersing agents such as TEGO® Dispers 652 (Tego Chemie Service USA, Hopewell, Va.), wetting agents, YELKIN® lecithin (Archer Daniels Midland Company, Decatur, Ill.) can be added to disperse pigments in the correction fluids, to improve the stability of the correction fluids, and/or to modify the viscosity of the color-change correction fluids. Plasticizers, such as ditridecyl phthalate, can be added to improve the flexibility of the film formed from the applied correction fluid. Anti-settling agents can also be included to prevent pigment settling and/or to modify the viscosity of the fluid.

Correction fluids in accordance with the disclosure can be better understood in light of the following examples. However, the foregoing description and the following examples are merely illustrative, and therefore no unnecessary limitations should be understood therefrom as numerous modifications and variations are expected to occur to those skilled in the art.

EXAMPLE 1

Color-Change Correction Fluid Formulations 89.65 parts of a commercially available n-heptane based correction fluid and 0.35 parts trihexyl amine (neutralizer) were mixed to form a correction fluid mixture. 0.2 parts Hodogaya Vermillion-DCF dye was dissolved in 7.8 parts 1,3-dioxolane to form a dye solution. 2 parts formic acid were added to the dye solution, and the resulting acidic solution was added to the previously prepared correction fluid mixture. The obtained color-change correction fluid was initially pink, but changed to white about 30 seconds after application to a paper substrate. The film formed by the applied correction fluid was sufficiently dry and hard to receive written marks.

The following table exemplifies three additional color-change correction fluids that were prepared. First, the film-forming polymer was dissolved in heptane to form a resin solution. The dispersant and plasticizer and then the pigment and pigment extender were added to the resin solution to form a mixture. The mixture was then mixed with a medium mill or a high-speed mixer to prepare a pigment dispersion. The neutralizer was then added and stirring was continued for at least 15 additional minutes. The color-change dye was dissolved in the cosolvent, and added to the pigment dispersion.

The volatile acid was then carefully added to the mixture, followed by the surfactant to form a color-change correction fluid.

The correction fluids were applied to paper using a small brush. The initial colors were pink, grey, and green for the correction fluids containing PERGASCRIPT® Red I-6B, PERGASCRIPT® Black I-2R, and PERGASCRIPT® Green I-2G, respectively. The color of the correction fluid changed to white within about 45 seconds to about 60 seconds after application to a paper substrate. The films formed by the applied corrections fluid were then sufficiently dry and hard to receive written marks.

| Chemical Component | Function | Indicator Color Red (parts by weight) | Indicator Color Black (parts by weight) | Indicator Color Green (parts by weight) |
|---|---|---|---|---|
| Heptane | Solvent | 39.084 | 39.084 | 39.084 |
| PLIOWAY ® Ultra 200 | Film-forming polymer | 8.375 | 8.375 | 8.375 |
| TEGO ® Dispers 652 | Dispersant | 1.675 | 1.675 | 1.675 |
| Ditridecyl phthalate | Plasticizer | 2.223 | 2.223 | 2.23 |
| Titanium Dioxide | Pigment | 50 | 50 | 50 |
| Neo Gen 2000 | Extender Pigments | 6 | 6 | 6 |
| Polyoxypropylene diamine | Neutralizer | 0.3 | 0.3 | 0.3 |
| Tetrahydrofuran | Cosolvent | 0.8 | 0.8 | 0.8 |
| PERGASCRIPT ® Red 1-6B | Color-change dye | 0.2 | | |
| PERGASCRIPT ® Black 1-2R | Color former | | 0.2 | |
| PERGASCRIPT ® Green 1-2G | Color former | | | 0.2 |
| Formic Acid | Volatile Acid | 1.5 | 1.5 | 1.5 |
| Lecithin | Surfactant | 1 | 1 | 1 |
| TOTAL | | 111.157 | 111.157 | 111.157 |

EXAMPLE 2

Color-Change Correction Fluid Formulation 20 parts of an aliphatic based correction fluid (e.g., comprising heptane, film-forming polymer, dispersant, and plasticizer, as above) is mixed with 0.3 parts SURFYNOL® 504 (Air Products and Chemicals, Inc., Allentown, Pa.). The resulting mixture is mixed with a medium mill or a high-speed mixer to prepare a pigment dispersion. 0.06 parts of o-cresolphthalein is dissolved in 0.20 parts ammonia (28 vol. %), and is added to the pigment dispersion. The resulting solution was then mixed to form a color-change correction fluid that is initially pink, but changes to white within about 15 seconds to about 60 seconds after application to a paper substrate. The film formed by the applied correction fluid is sufficiently dry and hard to receive corrective written marks.

EXAMPLE 3

Color-Change Correction Fluid Formulation

A solution comprising 0.34 parts o-cresolphthalein, 043 parts water, and 1.28 parts of AMP-95® (a volatile amine, 2-amino-2-methyl-1-propanol, available from Angus Chemical Company, a division of Dow Chemical Company, Midland, Mich.) was mixed and added to 69.65 parts of an aqueous dispersion containing titanium dioxide pigment particles to form an 'indicator mixture.' A polymer solution was prepared by dissolving 5.10 parts of a film-forming polymer into 20.43 parts of an aliphatic solvent (heptane). 1.92 parts of a first surfactant/emulsifier (BRIJ™ 93V), and 0.85 parts of a second surfactant/emulsifier (BRIJ™ 30) were then added to the polymer solution under mixing to form a final polymer solution. The indicator mixture was then added to the final polymer solution, and mixed to produce a solvent-based color-change correction fluid containing a water-in-oil emulsion. The resulting solution was initially red, but changed to white within about 30 seconds to about 60 seconds after application to a paper substrate. After this time period, the film formed by the applied correction fluid was sufficiently dry and hard to receive corrective written marks.

Although the foregoing text is a detailed description of numerous different embodiments of a color-change correction fluid, the detailed description is to be construed as exemplary only and does not describe every possible embodiment of a color-change correction fluid in accordance with the disclosure.

What is claimed is:

1. A color-change correction fluid comprising:
    an opacifying pigment;
    a film-forming polymer;
    a solvent system comprising an aliphatic solvent and one of a volatile acid and a volatile base;
    a color-change dye that becomes substantially colorless upon evaporation of the solvent system; and,
    a surfactant,
    wherein the color-change dye is present as a water-in-oil emulsion.

2. The color-change correction fluid according to claim 1, wherein the fluid comprises a volatile base and the color-change dye comprises a pH indicator dye.

3. The color-change correction fluid according to claim 1, wherein the fluid comprises a volatile base and the color-change dye is selected from the group consisting of o-cresolphthalein, phenolphthalein, thymolphthalein, m-nitrophenol, p-nitrophenol, cyanine, bis-(2,4-dinitro-phenyl)acetic acid ethyl ester, and mixtures thereof.

4. The color-change correction fluid according to claim 1, wherein the fluid comprises a volatile acid and the color-change dye comprises a leuco dye.

5. The color-change correction fluid according to claim 1, wherein the fluid comprises a volatile acid and the color-change dye is selected from the group consisting of diarylphthalide dyes, indolylphthalide dyes, fluoran dyes, acylleucoazine dyes, leucoauramine dyes, spiropyrane dyes, rhodaminelactam dyes, triarylmethane dyes, and chromene dyes.

6. The color-change correction fluid according to claim 1, wherein the color-change dye becomes substantially colorless at substantially the same time that the correction fluid becomes sufficiently dry so as to receive a corrective marking.

7. The color-change correction fluid according to claim 1, wherein the color-change dye becomes substantially colorless shortly after the correction fluid becomes sufficiently dry so as to receive a corrective marking.

8. The color-change correction fluid according to claim 1, wherein the correction fluid comprises a volatile acid and a non-volatile acid.

9. The color-change correction fluid according to claim 1, wherein the correction fluid comprises a volatile base and a non-volatile base.

10. The color-change correction fluid according to claim 1, wherein the opacifying pigment is present as a water-in-oil emulsion.

11. A correction fluid applicator containing the color-change correction fluid according to claim 1.

12. A capillary-action marker comprising a fibrous reservoir containing a color-change correction fluid according to claim 1 and a porous nib in fluid communication with the fibrous reservoir.

13. The color-change correction fluid according to claim 2, wherein the volatile base is selected from the group consisting of ammonia, tri-ethylamine (TEA), 2-amino-2-methyl-1-propanol (AMP), derivatives of AMP, morpholine, derivatives of morpholine, N,N-dimethylethanolamine (DMEA), and mixtures thereof.

14. The color-change correction fluid according to claim 2, wherein the volatile base is contained in an amount sufficient to cause the color-change dye to exhibit its characteristic color.

15. The color-change correction fluid according to claim 2, further comprising a basic extender pigment.

16. The color-change correction fluid according to claim 4, wherein the volatile acid is selected from the group consisting of formic acid, acetic acid, and trifluoroacetic acid.

17. The color-change correction fluid according to claim 4, wherein the volatile acid is contained in an amount sufficient to cause the color-change dye to exhibit its characteristic color.

18. The color-change correction fluid according to claim 4, further comprising an acidic extender pigment.

* * * * *